United States Patent [19]

Getson, Jr. et al.

[11] Patent Number: 4,663,733
[45] Date of Patent: May 5, 1987

[54] PROGRAMMABLE UNIVERSAL SYNCHRONIZATION BYTE DETECTOR

[75] Inventors: Edward F. Getson, Jr., Lynn; John W. Bradley, West Peabody; Bruce R. Cote, Dracut, all of Mass.

[73] Assignee: Honeywell Information Systems Inc., Waltham, Mass.

[21] Appl. No.: 657,716

[22] Filed: Oct. 4, 1985

[51] Int. Cl.4 .................. G06F 3/00; G06F 13/00
[52] U.S. Cl. .................... 364/900; 375/106; 360/69
[58] Field of Search ... 364/200 MS File, 900 MS File; 375/106; 360/88, 97, 137, 69

[56] References Cited

U.S. PATENT DOCUMENTS

| | | | |
|---|---|---|---|
| 3,417,377 | 12/1968 | Vietor et al. | 364/900 |
| 3,750,104 | 7/1973 | Chang | 364/900 |
| 4,210,959 | 7/1980 | Wozniak | 364/200 |
| 4,405,979 | 9/1983 | Holtey et al. | 364/200 |
| 4,509,121 | 4/1985 | Roy et al. | 364/200 |

*Primary Examiner*—Archie E. Williams
*Assistant Examiner*—William G. Messen
*Attorney, Agent, or Firm*—George Grayson; John S. Solakian

[57] ABSTRACT

Information read from a disk device includes synchronization bytes to enable a controller to get into byte synchronization with a stream of bits received from the disk. The stream of bits passes through a shift register. Firmware conditions a multiplexer which receives the parallel output of the serial register to select the high order binary ONE bit thereby enabling the controller to get into byte synchronization with the stream of bits.

9 Claims, 3 Drawing Figures

PROGRAMMABLE UNIVERSAL SYNCHRONIZATION BYTE DETECTOR

RELATED APPLICATION

The following U.S. patent application filed on an even date with the instant application and assigned to the same assignee as the instant application is related to the instant application and is incorporated herein by reference.

"A Shared Main Memory and Disk Controller Memory Address Register" having inventors John W. Bradley, Edward F. Getson, Jr. and Bruce R. Cote, having U.S. Ser. No. 657,715 and filed on Oct. 4, 1984.

BACKGROUND OF THE INVENTION

1. Field of the Invention

This invention relates generally to the field of mass storage disk devices, and more specifically to apparatus in a disk controller which enables the controller to get into byte synchronization with a serial stream of bits received from a disk device during a disk read operation.

2. Description of the Prior Art

A typical data processing system may include a main memory and a central processor unit (CPU) coupled to a disk controller which interfaces to a number of disk devices. Each disk device includes a number of disks mounted to a rotating shaft. Each disk surface is traversed by a magnetic head which may be indexed in a radial direction to fixed positions to read or write information which is stored in the magnetic material coated on each disk surface. Information is stored in concentric tracks on the surface of each track.

Each of the tracks is organized in sectors. Each sector includes address information identifying the sector and data byte information. Both the address information and the data byte information are preceded by a number of ZERO bytes followed by a synchronization character, followed by the information.

When the disk controller addresses a track on the disk, the disk controller receives a serial stream of data bits on a data signal line and a stream of clock bits to condition the disk controller to identify the data bits. Information is processed in the form of data bytes. Therefore, the stream of data bits must be organized into data bytes. The disk controller, therefore, tries to identify the synchronization byte in order to condition the disk controller to separate the data bit stream into data bytes.

In addition to the sector address and data byte information, the disk device may include defective track information which is written on one surface of a disk of the disk device. Defective track information includes those locations on the surface of a disk upon which information may not be stored. This may be caused by imperfections in the magnetic coating on an area of a disk surface.

This defective track information is written on a predetermined track sector by the manufacturer of the disk device when the disk device is tested. This defective track information must be preceded by a synchronization byte which may or may not be the same as the synchronization bytes preceding the sector address and data byte information. Also, different manufacturers may use different synchronization bytes.

The prior art disk drives included the logic for detection of the synchronization byte in the logic. To change the logic to recognize another synchronization byte required a hardware change which was costly, time-consuming and also required that records be kept of which disk controller could process information on which disk drive.

This also presented a problem of processing disk packs (replaceable by the user) which had been written on another data processing system using a different synchronization character.

OBJECTS OF THE INVENTION

Accordingly, it is an object of the invention to provide an improved disk controller.

It is another object of the invention to provide improved apparatus for recognizing a synchronization byte.

It is yet another object of the invention to provide improved apparatus responsive to firmware signals for recognizing different synchronization bytes.

SUMMARY OF THE INVENTION

Each track as a surface of a disk is divided into sectors. Each sector has an address field and a data byte field. Each address field includes a number of zero bytes followed by a synchronization byte, followed by address information specifying the sector address.

The data byte field follows the address field and includes a number of zero bytes followed by the synchronization byte, followed by a block of data bytes.

A controller is coupled to the disk drive and receives a sector mark signal indicating that the start of a sector is passing under the selected head. The sector mark signal received by the controller conditions the firmware to receive a stream of bits over signal NRZDAT+00 and a cyclic bit clock signal NRZCLK+00 to condition the controller to receive the bits during a read from disk operation in order to organize the bits into bytes.

The stream of bits is applied to a serial input of a shift register 24. Parallel output signals from shift register 24 are applied to their respective input terminals of a multiplexer (MUX) 28-2.

The controller takes no action as the stream of zero bits is clocked through the serial register 24 on the rise of the NRZCLK+00 clock signal. However, as the synchronization byte passes through the serial register 24, the high order ONE bit of the synchronization character generates the synchronization select signal SYNSEL+00 via MUX 28-2.

The firmware under the control of a microsequencer 18 and an arithmetic logic unit (ALU) 12 sets combinations of flops 14-2, 14-4 and 14-6 to generate select signals SYNSL1+00, SYNSL2+00 and SYNSL4+00 to select one of the input terminals of MUX 28-2.

The firmware selects that input terminal of MUX 28-2 that will result in the high order ONE bit of the synchronization byte generating the synchronization select signal SYNSEL+00 on that clock signal that loaded the seventh of the eight bits of the synchronization byte into the shift register.

The synchronization select signal SYNSEL+00 sets a flop 28-7 on the rise of the next bit clock signal. The flop 28-7 generates, in conjunction with a negative OR gate 28-5 and an inverter 28-36, a bit set signal BITSET+00 which sets a flop 28-13, one-half a clock cycle later. The output signal EDCSCK+ clocks the synchronization byte and all subsequent bytes in a register 23 for storage in a data RAM 8.

A counter 28-1 is loaded with hexadecimal 8 and counts between hexadecimal 8 and F in synchronization with the bits received by serial register 23 thereby placing the controller in byte synchronization with the stream of bits from the disk device.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

DESCRIPTION OF THE PREFERRED EMBODIMENT

Figure 1:
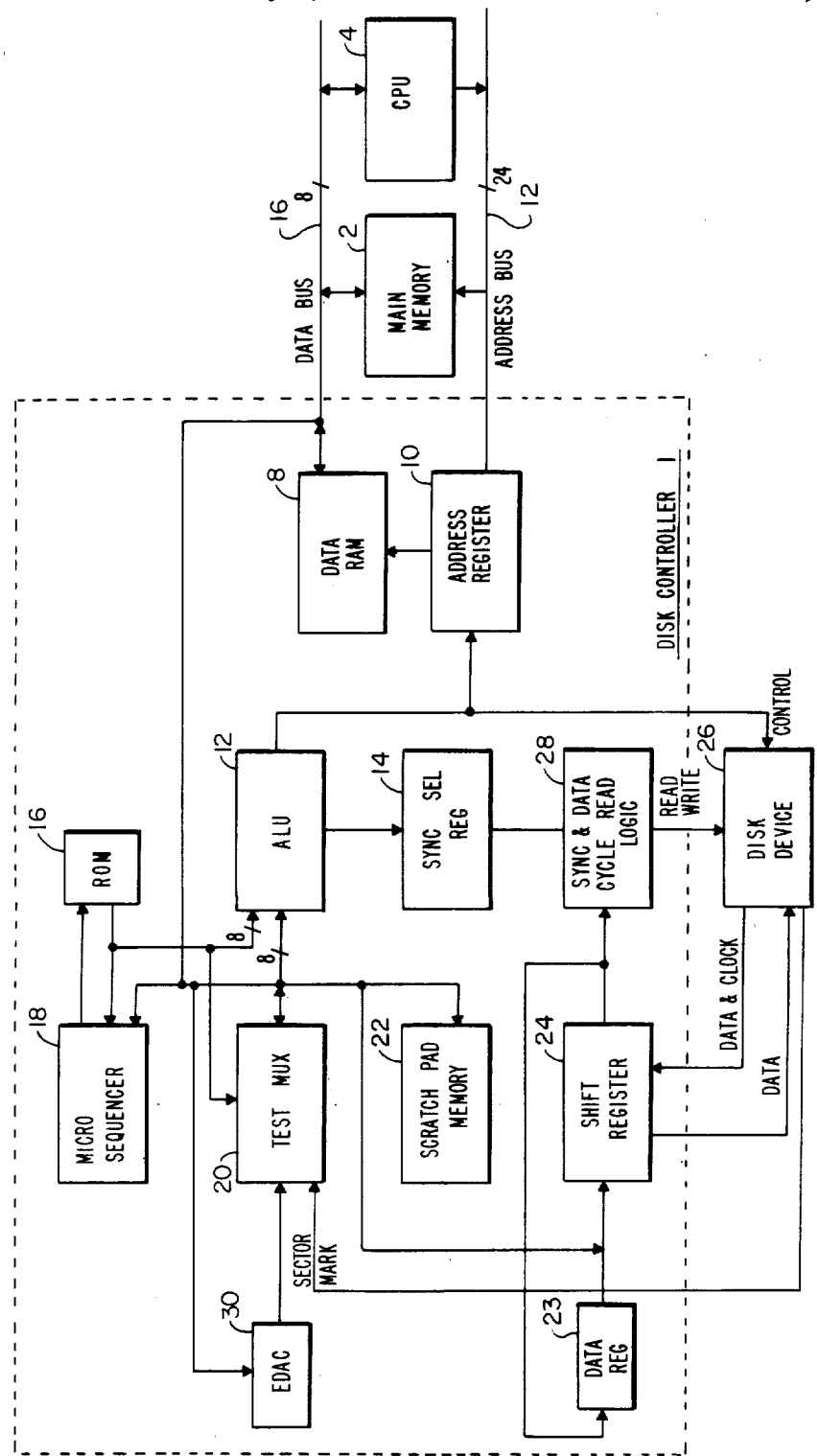
FIG. 1 shows a block of diagram of the disk controller.

Referring to FIG. 1, a disk device 26 includes a number of disks mounted on a rotating spindle having the top and bottom surfaces of each disk coated with a magnetic material. A read/write head for each surface is mounted on a carriage which moves radially in increments, allowing the heads to "float" above their respective surface and write data onto or read data from the surface of the disk. Each incremented position of a head defines a track. All heads define a cylinder of which each track is an element for that incremented position.

The disk typically contains 711 tracks, each track being divided into 95 sectors. Each sector contains an address synchronization byte followed by an address field and a data synchronization byte followed by a data field. The address field includes a flag byte, two cylinder number bytes, a track number byte, a sector number byte and two cyclic redundancy check bytes. The data field includes a data synchronization byte and 256 data bytes followed by 7 error detection and correction (EDAC) bytes. The address synchronization byte and the data synchronization byte may or may not have the same code.

In addition, the disk device 26 manufacturer includes one of the 95 sectors in which are written the location of defective areas of the disk surface preceded by a vendor synchronization byte.

In order to prepare the system for a disk device 26 main memory 2 data transfer, two configuration words are sent by a central processor 4 over data bus 16 to a scratch pad memory 22 under the control of a microsequencer 18 and firmware stored in a ROM 16.

Microsequencer 18 is typically an Am 2910 device described in "The Advanced Micro Devices Bipolar Microprocessor Logic and Interface Data Book-1980", published by Advanced Microdevices Inc., 901 Thompson Place, Sunnyvale, Ca. 94086.

The two configuration words include the cylinder address which indicates one of 711 cylinders, the head number which specifies the head which will read the track of the cylinder and a sector number which will read one of 95 sectors per track.

An input/output instruction is then sent to the disk controller which includes a starting address and a range. The starting address is the address of the first location of main memory 2 from which the first data byte is read during a disk device 26 write operation or into which the first byte is written during a disk device 26 read operation. The data transfer is completed when the range has decremented to ZERO. The range is the number of data bytes to be transferred.

The cylinder number, head number, sector number, address and range are stored in data RAM 8 and in a scratch pad memory 22 from central processor 4 via a data bus 16 under the control of the microsequencer 18 and the firmware in ROM 16.

Now assuming a disk device 26 to main memory 2 data byte transfer, once the disk head carriage is positioned to the specified cylinder and the head selected, the disk controller 1 awaits a sector mark signal SECTMK applied to a test multiplexer 20 to condition the microsequencer 18 and an arithmetic logic unit (ALU) 12 to generate signals which are applied to a synchronization and data cycle read logic 28 via a synchronization selection register 14 and also applied to a shift register 24 to read the data bits and clock bits received from the disk device 26.

The logic of the disk controller 1 receives the data bits looking for the address synchronization byte to allow the disk controller 1 to get into byte synchronization with the data bit stream. The first bytes will be the address information from that sector of the specified track following the sector mark signal SECTMK. This address information is compared with the address information stored in data RAM 8.

Each sector address in turn read from disk device 26 is compared with the sector address stored in data RAM 8. When there is agreement, then the logic is conditioned to test for the data synchronization byte and store the data field bytes in data RAM 8.

Once the addressed sector is found, a serial stream of data bits is received by the shift register 24, and in conjunction with the synchronization and data cycle logic 28, synchronizes the data bytes to the logic and stores the data bytes via a data register 23 in data RAM 8 starting with two locations less than the address specified by the input/output command.

This data transfer is initiated by a microsequencer 18 which together with the firmware stored in a read only memory 16 decrements the range stored in scratch pad memory 22. The hardware controls the incrementing of the contents of an address register 10 and the loading of data bytes into the data RAM 8. When the range equals zero indicating that all of the requested data bytes are stored in data RAM 8, then the microsequencer 18 loads the address register 10 with the starting address −2 and starts the data RAM 8 to main memory 2 data byte transfer. The address register 10 also addresses main memory 2 over address bus 12. This operation is described in copending related application Ser. No. 657,715 entitled "A Shared Main Memory and Disk Controller Memory Address Register".

For the main memory 2 to disk device 26 transfer, the address register 10 is again loaded by microsequencer 18 with the starting address which is applied to both data RAM 8 and main memory 2 over address bus 12. Data bytes are read from main memory 2 and stored in data RAM 8. The address register 10 is incremented and the range decremented. The data byte transfer is concluded when the range equals zero.

The arthimetic logic unit (ALU) 8 in conjunction with the microsequencer 18 and ROM 16 generates the starting address location. ALU 8 is made up of two 74S181 logic elements described in "The TTL Data Book for Design Engineers", Second Edition, published 1976 by Texas Instruments Inc. of Dallas, Tex.

The ALU 8 also loads the synchronization select register 14 with the location of the first binary ONE bit of the synchronization byte. The output of the register 14 is applied to the synchronization and data cycle read logic 28 to condition the logic 28 to receive the synchronization byte from shift register 24. If the synchronization byte is correct, a read/write signal is used by the disk device 26 to continue the reading of data bytes from the addressed sector of the track and to load these bytes into the data RAM 8.

The error detection and correction logic (EDAC) 30 generates EDAC characters which are written after the data field and are used to detect and correct errors during the read from the disk device 26 operation.

Figure 2:
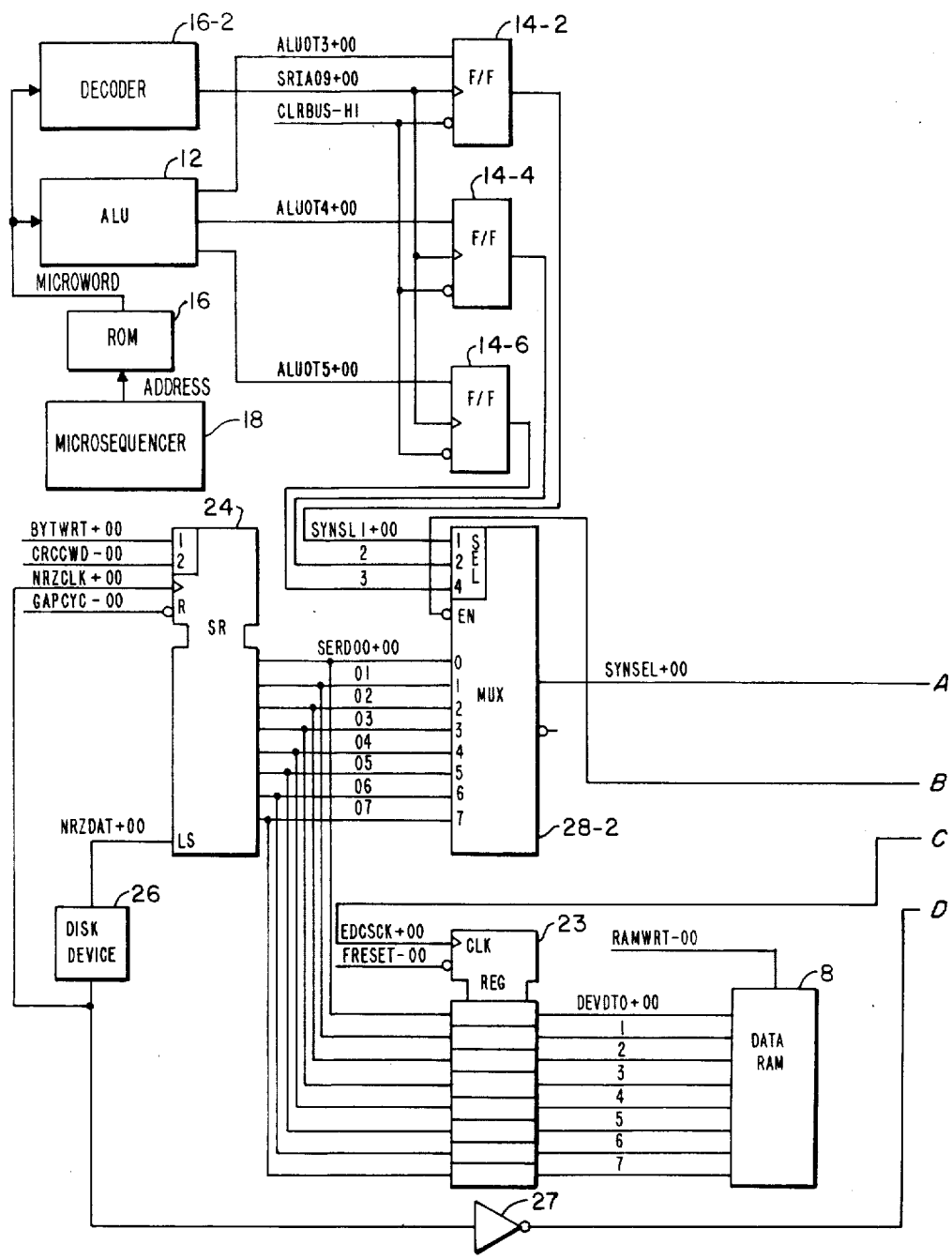
FIG. 2 shows the detailed byte synchronization logic.
Figure 2:
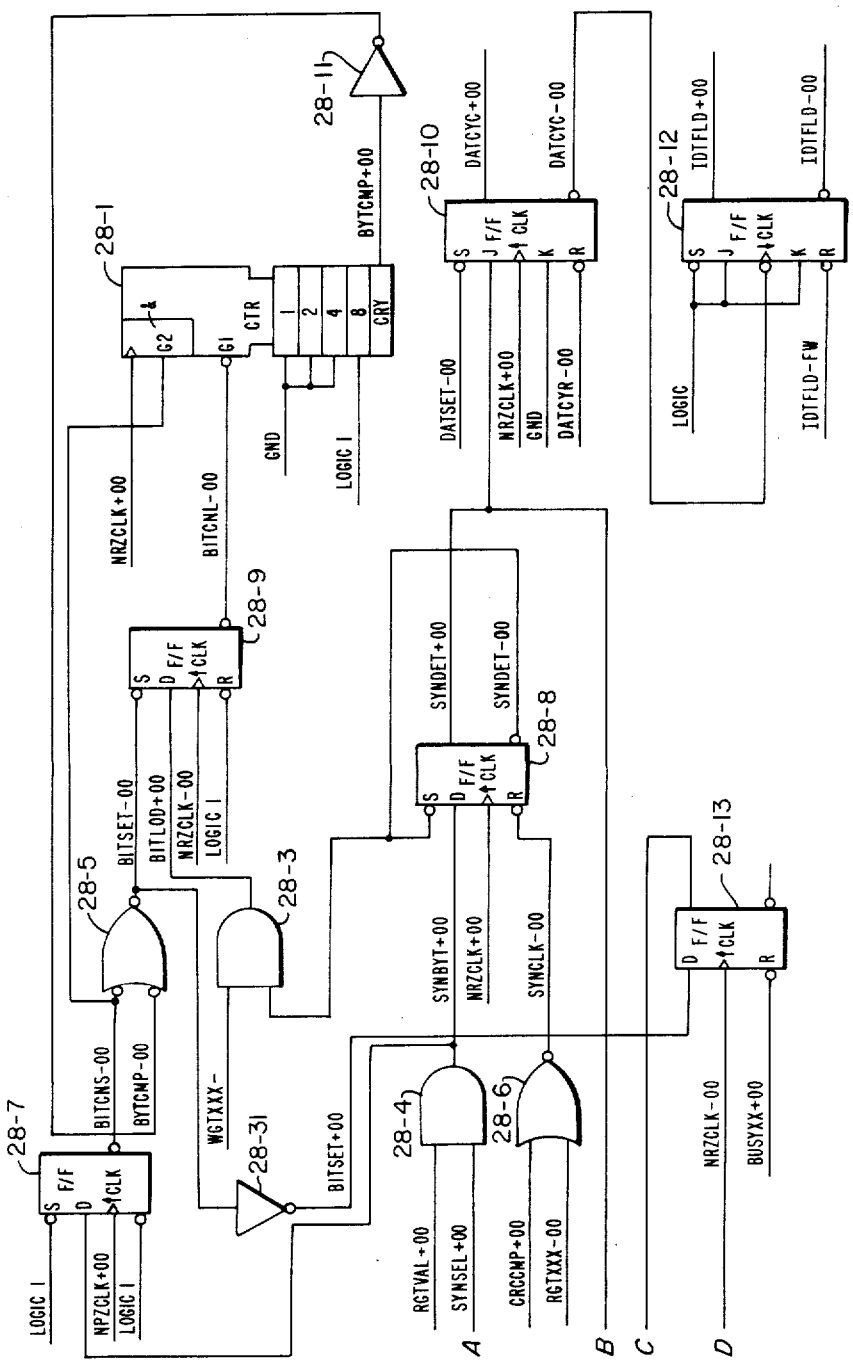
Figure 2:
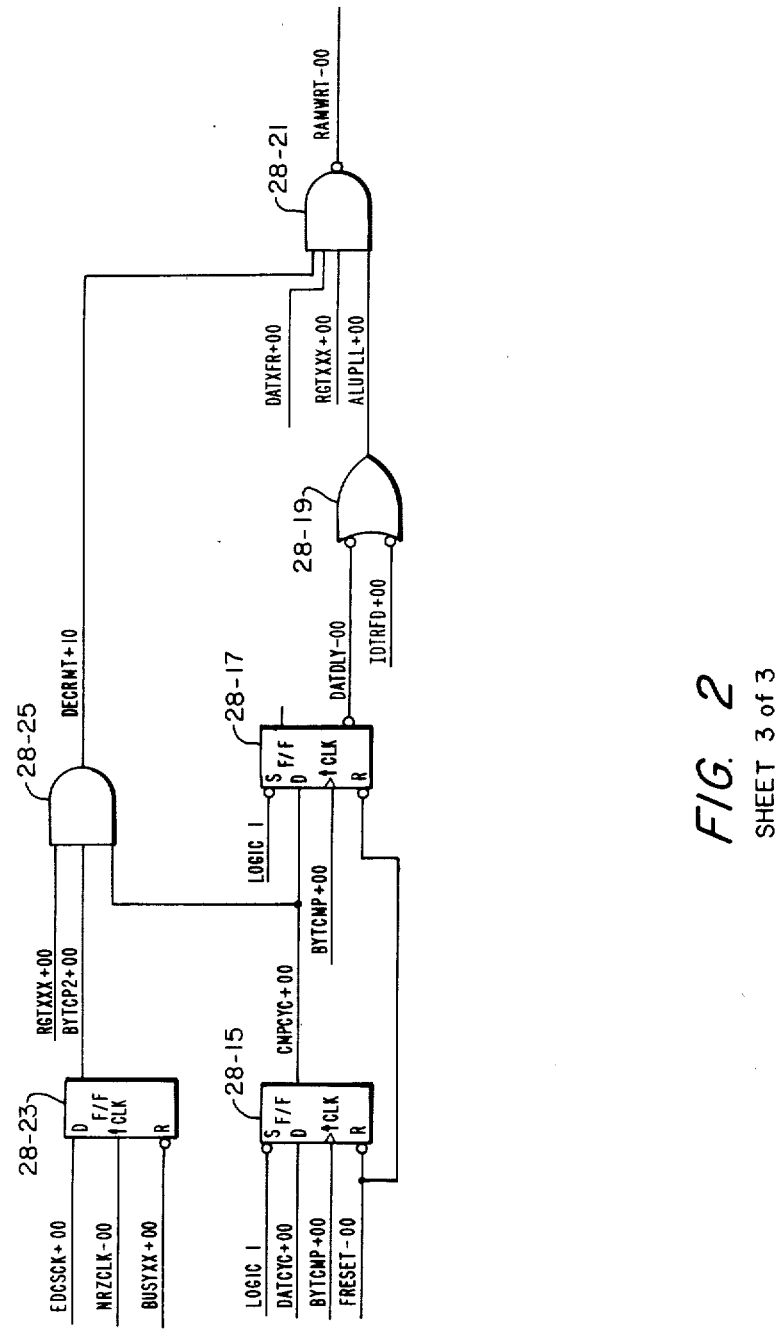

FIG. 2 shows the detailed logic for the disk controller 1 recognizing the synchronization byte and getting into byte synchronization with the stream of data bits received from disk device 26 which follows the synchronization byte.

Figure 3:
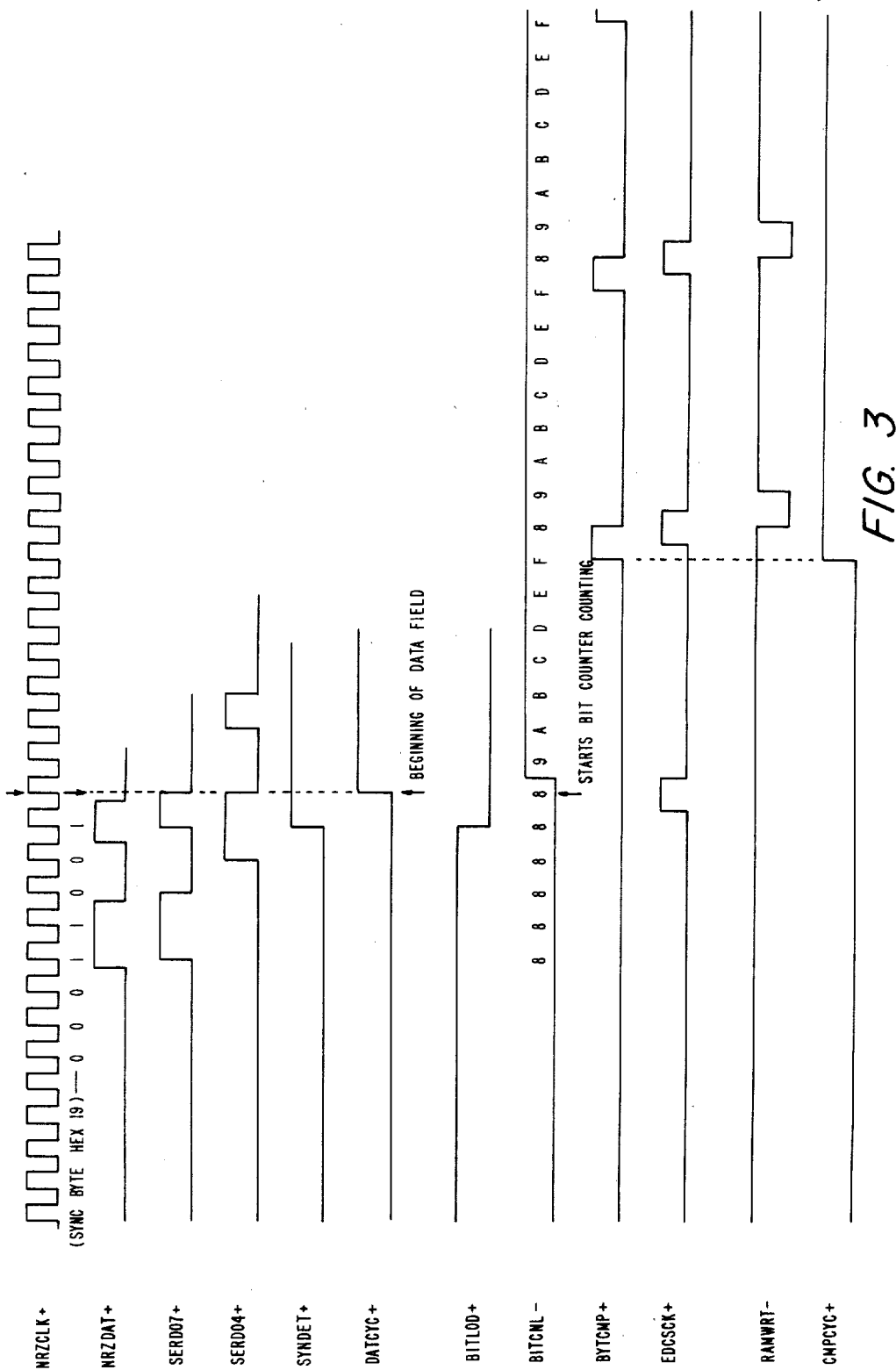
FIG. 3 shows a timing diagram of the synchronization logic.

Referring to the logic diagram of FIG. 2 and the timing diagram of FIG. 3, a stream of data bits and a free running square wave bit clock signal synchronized to the data bit stream are received from the disk device 26 during the disk read operation. The stream of data bits is received by shift register 24 via signal NRZDAT+00 and the clock signal is received via signal NRZCLK+00 and inverted by an inverter 27 into signal NRZCLK−00. The stream of data bits includes a string of binary ZERO data bits followed by a number of binary ZERO and binary ONE bits which make up a predetermined synchronization byte. The synchronization byte is used by the logic to assemble the data bits following the synchronization byte into bytes for storage in the data RAM 8.

Assume a byte hexadecimal 19 (0001 1001) is the synchronization byte. Since the data bits of the byte are received high order first, the first binary ONE data bit is the fourth data bit received. Therefore arithmetic logic unit (ALU) 12 is conditioned by the firmware stored in ROM 16 to set flop 14-6 on the rise of timing signal SRIA09+00 from a decoder 16-2 since signal ALUOT5+00 from ALU 12 is high. Flops 14-2 and 14-4 are not set since signals ALUOT3+00 and ALUOT4+00 are low. Decoder 16-2 decodes the microword signals from ROM 16. Synchronization signals SYNSL1+00, SYNSL2+00 and SYNSL4+00 from flops 14-2, 14-4 and 14-6, respectively, are applied to the select terminals of a multiplexer 28-2 to select input terminal 4. A clear bus signal CLRBUS−HI resets flops 14-2, 14-4 and 14-6 under firmware control.

As the data bits of the synchronization byte shifts through shift register 24, the first 3 binary ZERO bits appear as output signals SERD01+00, SERD02+00 and SERD03+00 and the first binary ONE data bit appears as output signal SERD04+00. Signal SERD04+00 is selected by MUX 28-2 and applied to an AND gate 28-4 input terminal as the synchronization select signal SYNSEL+00. Signal RGTVAL+00 is high during the disk read operation. Note that shift register 24 shifts data bits on the rise of the NRZCLK+00 clock signal. During the read from disk operation, the byte write signal BYTWRT+00 is low and the cyclic redundancy check signal CRCCWD−00 is high. Shift register 24 is reset by signal GAPCYC−00 during a write operation.

AND gate 28-4 output signal SYNBYT+00 at logical ONE is applied to the D input terminal of a flop 28-8 which sets on the rise of the next NRZCLK+00 clock signal. This clock signal also shifts the last data bit of the synchronization byte into shift register 24 which now stores the entire synchronization byte.

Flop 28-8 remains set by signal SYNDET−00 at logical ZERO being applied to the S terminal. Flop 28-8 is reset at the end of the read operation when read gate signal RGTXXX−00 goes high or the cyclic redundancy check complete signal CRCCMP+00 goes high indicating that the address field of the sector has been read correctly. Either signal high forces a NOR gate 28-6 output signal SYNCLR−00 low to reset flop 28-8.

MUX 28-2 is now disabled by flop 28-8 output signal SYNDET+00 applied to the enable terminal. Output signal SYNDET+00 causes a flop 28-10 to set on the next rise of the NRZCLK+00 clock signal generating the data cycle signal DATCYC+00. Flop 28-10 is reset by signal DATCYR−00 at the end of the address field and at the end of the data field.

Signal SYNBYT+00 causes a flop 28-7 to set on the rise of the NRZCLK+00 clock signal. Flop 28-7 sets on the same clock signal as flop 28-8. Flop 28-7 is reset on the next rise of the NRZCLK+00 clock signal. Output signal BITCNS−00 from flop 28-7 is applied to a negative OR gate 28-5. Output signal BITSET−00 in turn is inverted by an inverter 28-31. Signal BITSET+00 is applied to a flop 28-13 which sets on the rise of the NRZCLK−00 clock signal. This is one-half a clock cycle after flop 28-7 set but before the high order synchronization bit shifted out of shift register 24. Output signal EDCSCK+00 from flop 28-13 is applied to a register 23 to store the synchronization byte received from shift register 24 over signal lines SERD00+00 through SERD07+00. Flop 28-13 remains set for one NRZCLK−00 clock cycle. Flop 28-13 is also reset by the firmware generating a BUSYXX+00 signal.

Flop 28-9 remains set as the shift register 24 is receiving the synchronization byte. This results in output signal BITCNL−00 being low thereby forcing a counter 28-1 to hexadecimal 8. Flop 28-9 is held set by output signal BITCNS−00 being low, forcing output signal BITSET−00 from negative OR gate 28-5 low. Flop 28-7 is reset on the next rise of the NRZCLK+00 clock signal after signal SYNBYT+00 goes low. This forces signal BITCNS−00 high which starts counter 28-1 to count NRZCLK+00 clock pulses. The logic is now in byte synchronization since the counter 28-1 is essentially in synchronization with the first data bit of the next byte being received by the shift register 24. Counter 28-1 is a 74S161 logic element described in the aforementioned "TTL Data Book for Design Engineers".

Signal RAMWRT−00 is applied to data RAM 8 and when low causes a write operation in which the contents of register 23 is stored in a location of data RAM 8 specified by the contents of address register 10, FIG. 1.

For the normal read data operation from the disk device 26, only the data field bytes are stored in data RAM 8. The address bytes are compared with the desired address bytes stored in the data RAM 8.

The first data byte following the synchronization byte is written into data RAM 8 via signal IDTFLD+00 low, a NOR gate 28-19 signal ALWPLL+00, an AND gate 28-21 and signal RAMWRT−00 low. The read gate signal RGTXXX+00 is high at this time. Although flop 28-12 was set on the fall of the data cycle signal DATCYC−00, it was reset by firmware via signal IDTFLD−FW applied to the reset terminal.

For writing subsequent data bytes into data RAM 8, flop 28-15 is set during that first data byte cycle on the rise of the BYTCMP+00 signal since the data cycle signal DATCYC+00 is high. A flop 28-23 is set on the rise of the NRZCLK−00 clock signal since signal EDCSCK+00 is high. Flop 28-23 is reset under firmware control by signal BUSYXX+00. As described above, signal EDCSCK+00 loaded the data byte stored in shift register 24 into register 23. Flop 28-23 output signal BYTCP2+00 is applied to an AND gate 28-25 to generate output signal DECRMT+10. Signal RGTXXX+00 is high since this is a read operation and signal CMPCYC+00 is high since counter 28-1 indicates a complete byte is stored in register 23 by the rise of the BYTCMP+00 signal setting flop 28-15. Signal DATXFR+00 is generated by the firmware and applied to a NAND gate 28-21 to allow the data field byte to be written in data RAM 8 and to prevent the address field bytes from being written in data RAM 8. Output signal DECRMT+10 from AND gate 28-25 is applied to NAND gate 28-21 to force the data RAM 8 write signal RAMWRT−00 low for one NRZCLK−00 clock period for writing the data byte stored in register 23 into data RAM 8. Flops 28-15 and 28-17 are reset under firmware control by signal FRESET−00. This process is repeated for each data byte in the data field until the range has decremented to ZERO.

Note that since signal BITCNS−00 is high, the counter 28-1 was counting NRZCLK+00 clock cycles. At the end of the first byte following the synchronization byte, counter 28-1 when counting from hexadecimal 8 to hexadecimal 0 generated a carry after incrementing hexadecimal F. This generated the byte complete signal BYTCMP+00 high and signal BYTCMP−00 low via an inverter 28-11. Signal BYTCMP−00 low applied to negative OR gate 28-5 sets flop 28-9 via signal BITSET−00. Therefore, counter 28-1 is again reset to hexadecimal 8 rather than remaining at hexadecimal 0. Counter 28-1, therefore, counts from hexadecimal 8 to hexadecimal F for the bits of each byte read from the disk device 26.

Referring to the timing diagram of FIG. 3, signal NRZCLK+ shows the free running clock signal from disk device 26. Data signal NRZDAT+ timed to the clock signal shows the synchronization byte timing hexadecimal 19 being received by shift register 23. The synchronization byte is shown on SERD07+ as it is synchronized to the rise of signal NRZCLK+.

The MUX 28-2 receives SERD04+ and generates signal SYNSEL+00 to set flop 28-8 to generate signals SYNDET+ and BITLOD+ on the next rise of signal NRZCLK+. Signal DATCYC+ indicates the beginning of the data field. Signal BITLOD+ high forces flop 28-9 to remain set forcing counter 28-1 to remain at hexadecimal 8. Signal BITLOD+ causes flop 28-9 to reset on the next rise of NRZCLK+ to allow counter 28-1 to count in synchronization with the data bits received by shift register 23 so that signal BYTCMP+ indicates that the complete data byte is stored in shift register 23.

Signal BYTCMP+ high results in signal EDCSCK+ high on the next rise. Signal EDCSCK+ causes the contents of the shift register 23 into register 24.

Signal RAMWRT− writes the contents of register 24 into data RAM 8. Note that the synchronization byte, although stored in register 23, is not stored in data RAM 8.

Signal CMPCYC+ is high for the entire data field to control signal RAMWRT−.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A disk controller for receiving a stream of bits from a disk device and including apparatus for organizing said stream of bits into bytes, said bytes including a predetermined synchronization byte followed by a plurality of data bytes, said apparatus including:

shift register means for receiving signals representative of said stream of bits and generating a plurality of output signals indicating said bit signals stored in said shift register means;

processor means for generating a plurality of select signals specifying the location of a high order binary ONE bit of said predetermined synchronization byte;

multiplexer means coupled to said processor means and said shift register means and responsive to said plurality of select signals for activating a corresponding input terminal for receiving said plurality of output signals and for selecting said high order binary ONE bit thereby generating a synchronization select signal;

control byte means coupled to said multiplexer means and responsive to said synchronization select signal for generating a byte complete signal for each byte stored in said shift register means; and first storage means coupled to said control byte means and said shift register means and responsive to each occurrence of said byte complete signal for storing each of said plurality of data bytes received from said plurality of output signals;

wherein said processor means generates another combination of said plurality of select signals for enabling said processor means to select one of said plurality of output signals representative of another of a plurality of synchronization bytes.

2. The apparatus of claim 1 wherein said shift register means comprises:

a shift register for receiving said stream of bit signals at a serial input terminal and said shift register being responsive to a cyclic bit clock signal received from said disk device for shifting in each of said stream of bit signals on each rise of said cyclic bit clock signal, said each of said stream of bit signals appearing successively on each of said plurality of output signals.

3. The apparatus of claim 2 wherein said processor means comprises:

read only memory means for storing a plurality of microwords;

microsequencer means coupled to said read only memory means and generating a sequence of address signals, said read only memory means being responsive to said sequence of address signals for reading out signals representative of said plurality of microwords;

arithmetic logic unit (ALU) means coupled to said read only memory means and responsive to said plurality odf microword signals for generating a plurality of ALU signals; and second storage means coupled to said read only memory means and said ALU means and responsive to one of said plurality of microword signals and said plurality of ALU signals for generating a plurality of select signals.

4. The apparatus of claim 3 wherein said multiplexer means comprises:

a multiplexer coupled to said second storage means and said shift register and responsive to said plurality of select signals for selecting said predetermined one of said output signals for receiving said high order binary ONE bit of said synchronization byte on a rise of said cyclic bit clock signal as a seventh bit of said synchronization byte having eight bits is stored in said shift register, said multiplexer generating said synchronization select signal.

5. The apparatus of claim 4 wherein said control byte means comprises:

third storage means coupled to said multiplexer and responsive to said synchronization select signal and the rise of said cyclic bit clock signal for generating a first signal in a second state; and a bit counter coupled to said third storage means and responsive to said first signal in said second state for loading a predetermined count in said bit counter.

6. The apparatus of claim 5 wherein said control byte means further comprises:

further storage means coupled to said multiplexer and responsive to said synchronization signal and the rise of said cyclic bit clock signal for generating a second signal in a first state for disabling said multiplexer.

7. The apparatus of claim 6 wherein said control byte means further comprises:

fifth storage means coupled to said fourth storage means and responsive to said second signal in a first state for generating a third signal in a second state, said bit counter being responsive to said third signal in said second state for counting the number of said cyclic bit clock signals and generating said byte complete signal in synchronization with said shift register receiving said each byte.

8. The apparatus of claim 7 wherein said first storage means comprises:

a register coupled to said shift register and said bit counter and responsive to said byte complete signal for storing said each byte received from said plurality of output signals.

9. Apparatus for receiving a stream of data bits for organizing into bytes, said apparatus comprising:

first means for receiving data signals representative of said stream of data bits and sequentially generating a plurality of parallel output signals as said data bit signals are shifted through said first means;

second means coupled to said first means for selecting a predetermined one of said plurality of parallel output signals;

third means coupled to said second means and responsive to a first binary ONE bit of said stream of data bits received over said predetermined one of said plurality of parallel output signals for generating a sequence of byte complete signals as subsequent data bits of said stream of data bits are received by said first means; and fourth means coupled to said first means and said third means and responsive to said sequence of said byte complete signals for storing a sequence of said bytes received from said plurality of parallel output signals;

wherein said second means is responsive to microword signals from a fifth means for selecting another one of said plurality of parallel output signals when said first binary ONE bit is in a different predetermined position of said stream of data bits.

* * * * *

UNITED STATES PATENT AND TRADEMARK OFFICE
CERTIFICATE OF CORRECTION

PATENT NO. : 4,663,733

DATED : May 5, 1987

INVENTOR(S) : Edward F. Getson, Jr., John W. Bradley, and Bruce R. Cote

It is certified that error appears in the above-identified patent and that said Letters Patent are hereby corrected as shown below:

On the Title Page Item [22] should read

-- (22) Filed: October 4, 1984 --.

Signed and Sealed this

Twenty-seventh Day of October, 1987

Attest:

DONALD J. QUIGG

Attesting Officer

Commissioner of Patents and Trademarks